Sept. 11, 1956 B. BERGHAUS ET AL 2,762,945
PASSING AN ELECTRIC CONDUCTOR THROUGH THE
BOUNDING WALLS OF DISCHARGE VESSELS
Filed Jan. 18, 1951
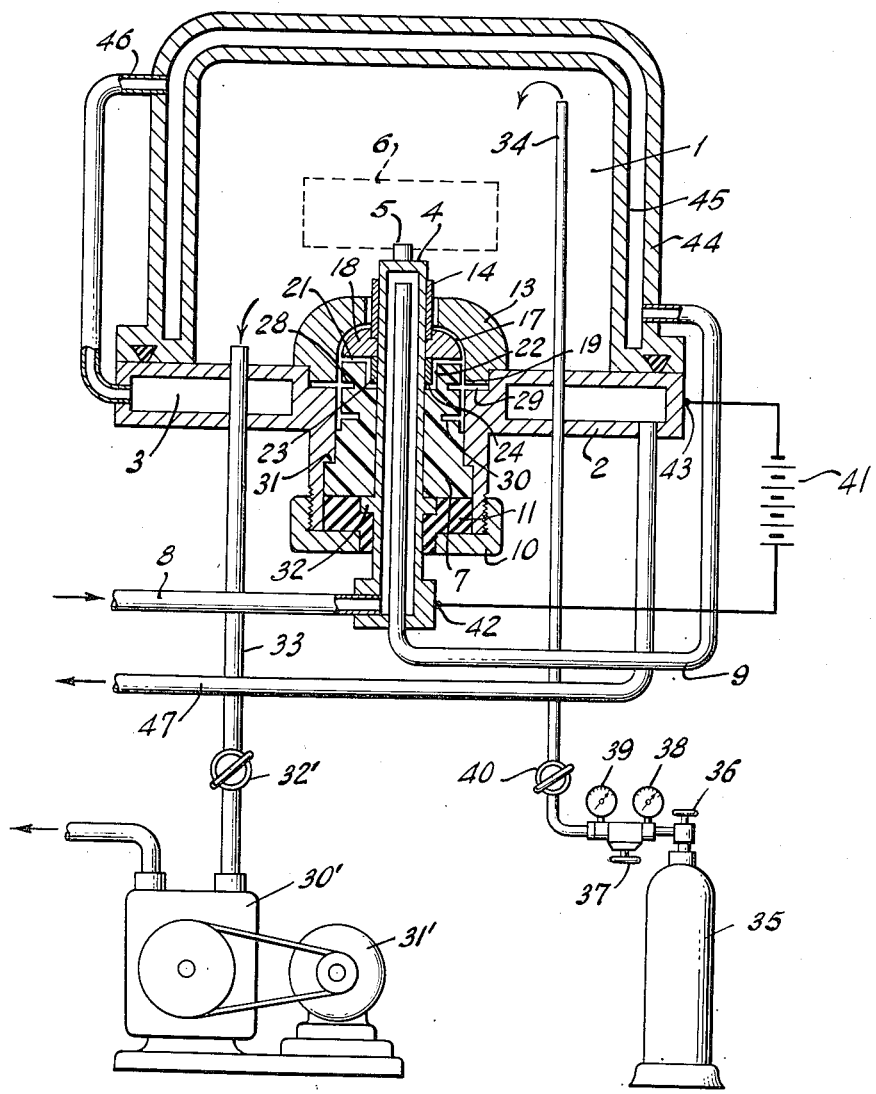
INVENTORS:
BERNHARD BERGHAUS
HANS BUCEK
BY
Joseph Hirschmann
ATTORNEY

United States Patent Office 2,762,945
Patented Sept. 11, 1956

2,762,945

PASSING AN ELECTRIC CONDUCTOR THROUGH THE BOUNDING WALLS OF DISCHARGE VESSELS

Bernhard Berghaus, Lachen, and Hans Bucek, Zurich, Switzerland; said Bucek assignor to said Berghaus Application January 18, 1951, Serial No. 206,673

4 Claims. (Cl. 313—185)

It is well known from present day scientific knowledge that glow discharges occur at pressures from a hundredth of a millimetre mercury column (0.01 mm. Hg). At low pressures between 0.1 and 5 mm. Hg the passage of electricity through the gas takes place as a glow discharge in the usual manner. In the pressure region from 5 to 20 mm. Hg, these glow discharges may, under certain circumstances, be still maintained but they are already unstable and may finally pass over into the normal spark or arc discharge when the pressure is further increased, depending on the power of the supplying source of current (see Loeb, Fundamental Processes of Electrical Discharge in Gases, New York, John Wiley and Sons, Inc., 1947).

Disregarding the use of gaseous discharges for illuminating purposes, the technical application of same is found in the field of metal sputtering, heating in low-pressure glow discharges, carrying out chemical reactions in dark corona discharges under atmospheric pressure, for example for the production of ozone, or in the form of scintillating discharges of a few tenths of an atmosphere as used for example in the synthesis of hydrocarbons. Further, the electric arc is used, in an atmosphere consisting of air, for the production of nitrogen or, in different atmospheres, for producing other substances, for example, for manufacturing acetylene in a hydrogen atmosphere. In these cases, either pure temperature effects are created or the substances are influenced chemically or electrically.

According to further literature, glow discharges of high intensity at gas pressures up to 40 mm. Hg have already been applied for the surface improving of materials, particularly metals, or for other treatment. It may be assumed that a really certain control of such processes, such as is necessary for any technical application, is only possible at pressures up to not more than 10 mm. Hg, whilst the region between 10 and 40 mm. Hg has been ruled out as being of no practical application. The production of stable glow discharges at these pressures is indeed very difficult, especially as intense local heating and chemical attacks occur, due to ion bombardment and as the consequence of electron streams. The glowing tract produced by the discharges severely narrows itself down with increasing pressure, so that large quantities of energy are released over a small space, with the result that the abovementioned local heating effects and chemical actions arise. The consequence is that the lead-in devices, and particularly their insulation, are extensively destroyed by these discharges in a relatively short time. These facts must be taken into account particularly in the case of high-intensity discharges such as are met with in the technical field, for example for treating materials, chemical synthesis and disintegration processes. It must also be taken into account that these conversion processes release considerable quantities of metallic vapor and atomized particles which lead to depositions on the electrodes and even to bridge formations, so that flash-overs with their destructuve accompanying effects occur.

According to the conception already put forth and confirmed by the most up-to-date literature (Loeb and others), there is however no possibility of exploiting economically the low pressures under consideration. Generally the notion has been held, and will continue to be held, that apart from the above-mentioned low pressures of 40 mm. Hg, quoted in the cited literature, technically applicable glow discharges are only attainable at pressures of 5 mm. Hg and still lower, if there is not to be the risk of the glow discharge passing over into other discharge forms, particularly sleeve discharges and scintillating discharges. These forms have the fundamental defect, which precludes their practical utility, namely that their expanse is superficially very limited and in fact is generally confined to a spot. This incurs intense local heating and over-heating and to an energy distribution restricted exclusively to the discharge path between anode and cathode. Hence it is not possible for work-pieces to be treated over their entire surface once they have been given their shape. Moreover, the desired transfer of a maximum proportion of the available electrical energy to the work-piece under treatment does not take place.

In contrast to the above, glow discharges within the meaning of the present invention imply gaseous discharges which manifest the typical external form of the discharge even at pressures above the region from 5 to 40 mm. Hg possibly up to atmospheric pressure and beyond. Thus the energies supplied may amount to many times the values usual in the well known applications, say for lighting purposes, i. e. several or even many kilowatts.

Means for carrying out such processes consist of discharge vessels, the walls of which are traversed by lead-in devices, so that it is necessary to protect these lead-in devices against the action of gaseous discharges. This protection is afforded throughout by means of screening gaps or interstices of suitable dimensions which are arranged on the one hand between metallic lead-in elements of different polarity and potential and on the other hand preferably also between these parts and insulators. Owing to the high temperatures generated these lead-in elements are generally cooled. In order to prevent falling particles, particularly metallic ones, from penetrating, it has already been proposed to screen these discharge protection gaps by means of dished, disc-shaped or bell-shaped shields above the apertures of these gaps facing the discharge spaces, or to make the gap itself curved, stepped or generally labyrinthine in shape, so as to make a direct straight-line penetration of these particles into the gap impossible. The practical operation of such gaseous discharge furnaces has however shown that whilst these measures were able to prevent the direct falling of conducting particles into the screening gap, no reliability of working could be guaranteed over fairly long periods, that is, in spite of these arrangements there regularly occurred intense local corrosions, further damage and finally destruction of the insulators. For a long time this was completely inexplicable.

It required minute and tedious investigation and working experience to ascertain the cause of these deleterious phenomena. It was found that in few cases was it attributable to the particles falling into the gap and that these intense local heatings occurred in association with surprisingly increased chemical activity of gases otherwise inert under usual conditions. The real cause of the trouble was found to be the completely unsuspected condensation effects. These condensates are formed by invisible metallic vapors, which of course also fill the gaps. There they impinge upon cooled parts on which they deposit themselves in the form of an extraordinary loose and clinging, furry or velvety coating of the finest structure. Due to the heavy coating, this gave rise to bridging effects and flash-overs in the exceedingly fine gaps. These effects were quite indiscernible because the immediate corrosion so destroyed the surface that the condensates and flash-overs became invisible. Moreover at each dismantling of the lead-in element, the particles, loosely dusted on the coated parts, fell off. Thus a completely inexplicable state of affairs arose.

Proceeding form the explanations of the above observations arrived at after patient detail work it is proposed according to the invention to construct the gap-forming component elements, carrying anode and cathode potential, in such a way that they comprise separate pieces of easier accessibility, by dividing them up adjacent to insulators.

It is admittedly already known for structural elements of such current leads at anodic and cathodic potential to be formed of several parts. However, as the knowledge on which the present invention is based was lacking, it was exclusively a question of measures to facilitate assembly and dismantling. These measures were necessary because the above-mentioned dished, disc-shaped or bell-shaped shields could not, because of their diameter, pass in and out of the apertures provided in the wall enclosing the discharge vessel to give access to the current leads. Furthermore, in such cases either only one of the anodic or cathodic structural elements was divided or, in the event of both being divided, the separating joints were not in proximity to insulators. Hence the possibility now disclosed by the invention, of eliminating the deposits or of cleaning the dismantled structural elements did not exist, because the condensation deposits were precipitated at the anodic as well as the cathodic structural elements. Moreover access to the insulators was afforded for the reason that experience had shown that it was precisely the insulators which were exposed most severely to injurious and destructive processes.

If the gap-forming structural elements at anodic or cathodic potential comprise two or more separate pieces, these divided pieces may bound the gap-like interstices particularly at their commencement counting from the discharge space. This thereby affords access and hence cleaning facility to precisely those surfaces which are exposed most intensely to the risk of condensation effects. Preferably the separate pieces formed by the joints are so made that they can be withdrawn from supporting and centering members—or mountable thereon—in the longitudinal direction of the current lead, so that they can be cleaned during working pauses or even during operation. This generally consists merely of wiping off.

It is practicable if the separate pieces divided by joints are shaped in such a way as to favour the seating of extraneous elements. Furthermore, the thermic condition of these elements may be appropriately influenced as an additional feature or as a sole feature. For example, this may be accomplished either by intensely cooling these parts themselves or at least by placing them in the vicinity of directly cooled electrode parts. Thus when suitably shaped these elements cause the metallic vapors to condense. In addition, the parts may be given a high heat capacity by choosing a suitable material or by covering with substances having such a high heat capacity. What has been said with regard to the thermic condition applies appropriately to magnetic, electric and electromagnetic conditions by forming the parts as metallic bodies carrying certain potentials and polarities. The result is that the vapors, which consist throughout of charge carriers, are attracted by one of the two electrodes or by both of them. Further advantages are that, as the result of dividing up the lead-in member into separate individual pieces, the unavoidable thermal expansion, as the result of high temperature drops between the cooled and uncooled parts, is unable to produce any deleterious effects. As fitted seatings prevent easy detachment, any voltages arising are adequately compensated in the event of loose fits or easily running screw threads.

The drawing illustrates an embodiment of the invention in the form of a lead-in device to a discharge space constructed as a vacuum chamber, it being immaterial whether the lead-in is provided in the base, in the side walls or on the cover of the vacuum chamber. In the latter case, the sliding seating illustrated for the case of a base attachment will be replaced by a thread or by sliding parts locked by a bayonet fitting.

The drawing illustrates a cooled gaseous discharge chamber in which the lead-in device to the process chamber 1 is provided in the base. The present case concerns a double-walled base 2, forming a cooling-space 3, which contains or is traversed by a coolant. The vessel walls are connected to the anode. The cathode 4 is lead through the insulator 7 along with the portion 5 which serves for mounting the work-piece 6 being treated. The cathode is cooled. The coolant entrance is at 8, the exit at 9, so that cooling of the cathode over its entire length is ensured. A screw cap 10 presses a packing 11 against the insulator 7. Rubber, plastic or other insulating medium is employed as packing materials.

The insulator 7 has a somewhat smaller diameter at the top than in the vicinity of the packing 11, so that a gap or screening space 19 is formed. The insulator 7 continues up to the level of the chamber base portion 2. The annular gap lies in its uppermost portion 16 between the metallic, demountable, spherical anode cap 13 and a first mountable cathode portion 14. In addition to the portions 13 and 14, the portion 18 is also a demountable part, so that the entire arrangement according to the invention is characterized by the fact that the structural elements carrying anode and cathode potential and forming the gaps 16, 17 and 22, comprise individual pieces of very easy accessibility by dividing them up at least adjacent to parts of the insulator 7. It only requires withdrawal of the mounted elements 13, 14 and 18 in upwards direction from the interior of the chamber to give access to those surfaces on which, depending on the particular cooling arrangement, precipitations from metallic vapors take place to an excessive degree. The shaping of the elements, and their thermal and electrical condition are thus adjusted and selected to fulfil the conditions required by the invention. By suitable arrangement of electromagnets the same results may be obtained or the effects attained may be still improved.

To increase the reliability of operation, in addition to the abovementioned screening gaps 16, 17, 19 there may also be provided transverse gaps suitably formed by utilising the demountable parts. Thus the detachable cathode portion 18 may have a slight spacing from the upper end face of the insulator 7, so that a first transverse gap 21 is formed. Further, a cylindrical cavity hollowed out from the upper end face of the insulator is so provided that, in conjunction with the demountable cathode member 23, it gives rise to an annular cylindrical gap 22 along with a transverse gap 24. However, the discontinuities in the course of the screening gaps may also be realized without the demountable parts. Thus in the insulator 7, which may rest on a flange 32 on the cathode 4, there are transverse gaps in the form of annular slots at 28 and 30. On the other hand, the demountable anode portion 13 has its bottom face adapted to form between itself and the anode 2, an annular slot 29 situated opposite the annular slot 28 in the insulator 7. A shoulder 31 on the insulator 7 acting in conjunction with the screw cap 10 serves to ensure a firm seating of the insulator and therefore of the entire cathode system.

The drawing also illustrates certain additional devices. In the first place there is an evacuating pump 30' driven by the electric motor 31'. A shut-off device 32' makes it possible to seal off the interior of the discharge chambers from the evacuation pump completely. The evacuation pump itself is connected to the discharge vessel 1 through the conduit 33. There is also provided a supply pipe 34 for any treating gases which are stored in the cylinder 35 or in a gas-holder or the like. The cylinder 35 is provided in the usual manner with a shut-off device 36, a pressure-reducing valve 37, pressure-indicating devices 38, 39 in front of and behind the pressure-reducing valve, as well as a shut-off device 40. The source of current 41 is connected to the cathode 4 at 42, whilst the anode 2 is connected to the source of current 41 at 43. The coolant led off from the cathode over the tube 9 also serves to cool the cap-shaped casing 44 of the gaseous discharge space 1. The cap 44 is made double-walled to form a cooling space 45 which is in communication with the tube 9. The coolant is drawn off at 46 and after flowing through the cooling space 3 is led away at 47.

The invention described herein relates to the same general type of apparatus as is disclosed in our copending applications Ser. Nos. 206,672, now Patent No. 2,701,846, 206,674, and 206,675, all filed January 18, 1951. Ser. No. 206,672 relates generally to the provision of a discontinuity in the gap, while Ser. Nos. 206,674 and 206,675 relate to the method and means for altering the intensity of the glow discharge, or for diminishing the effects of high-frequency oscillators in the glow discharge.

What we claim is:

1. In a glow discharge device including a closed chamber having electrodes adapted to be connected with a source of electric potential and to be operated at sub-atmospheric pressures, the combination with said electrodes, of an insulator disposed between the electrodes of which one passes through a wall of the chamber, in such manner that a gap is provided therebetween, said gap, viewed from the interior of the chamber, being disposed in front of the insulator, the length of the gap between the region of contact of the insulator with an electrode and the opening into the interior of the device being large in comparison with its width, the insulator projecting toward the interior of the chamber and terminating adjacent to the inner surface of the chamber wall, the parts of the electrode bounding the mouth of the gap in the interior of the device being removable from inside the chamber to expose the surface of the insulator within the chamber.

2. In a glow discharge device including a closed chamber having electrodes adapted to be connected with a source of electric potential, the combination with said electrodes, of which one passes through a wall of the chamber, of an insulator disposed between the electrodes and projecting toward the interior of the chamber to such an extent that the inner face of the insulator is adjacent to the inner face of the chamber wall, there being a gap between the insulator and one of the electrodes, said electrodes having parts separated by a gap into which the first gap debouches, at least one of said parts being removable by hand to afford access to the insulator from the interior of the chamber.

3. A device according to claim 2, wherein the electrodes are arranged concentrically, the first gap being disposed between the insulator and the outer electrode, the inner electrode being tubular, and said electrode parts including an annular member surrounding the inner electrode in electrical contact therewith, and disposed in front of the insulator spaced by a gap therefrom, and a second annular member overlying the first member and in electrical contact with the outer electrode.

4. A glow discharge device as defined in claim 2, wherein the said electrode parts overlie each other in the direction of the interior of the chamber, so that the gap between them extends at an angle to the first mentioned gap.

References Cited in the file of this patent

UNITED STATES PATENTS

| | | |
|---|---|---|
| 1,905,993 | Buff | Apr. 25, 1933 |
| 2,031,214 | Fisher | Feb. 28, 1936 |
| 2,219,611 | Berghaus et al. | Oct. 29, 1940 |
| 2,219,613 | Berghaus et al. | Oct. 29, 1940 |
| 2,219,614 | Berghaus et al. | Oct. 29, 1940 |
| 2,219,615 | Berghaus et al. | Oct. 29, 1940 |
| 2,257,411 | Berghaus et al. | Sept. 30, 1941 |
| 2,454,757 | Smith | Nov. 23, 1948 |
| 2,468,175 | Cotton | Apr. 26, 1949 |